Feb. 3, 1948.   J. J. HITE   2,435,353
MATERIAL HANDLING APPARATUS
Filed May 8, 1944   7 Sheets-Sheet 4

INVENTOR.
JOSEPH J. HITE
BY
G. H. Braddock
ATTORNEY

Feb. 3, 1948.  J. J. HITE  2,435,353
MATERIAL HANDLING APPARATUS
Filed May 8, 1944  7 Sheets-Sheet 5

INVENTOR.
JOSEPH J. HITE
BY
G. H. Braddock
ATTORNEY

Feb. 3, 1948.   J. J. HITE   2,435,353
MATERIAL HANDLING APPARATUS
Filed May 8, 1944   7 Sheets-Sheet 6

INVENTOR.
JOSEPH J. HITE
BY
*G. H. Braddock*
ATTORNEY

Feb. 3, 1948.    J. J. HITE    2,435,353
MATERIAL HANDLING APPARATUS
Filed May 8, 1944    7 Sheets-Sheet 7

INVENTOR.
JOSEPH J. HITE
BY
G. H. Braddock
ATTORNEY

Patented Feb. 3, 1948

2,435,353

UNITED STATES PATENT OFFICE 2,435,353

MATERIAL HANDLING APPARATUS

Joseph J. Hite, St. Paul, Minn., assignor to American Hoist & Derrick Co., St. Paul, Minn., a corporation of Delaware Application May 8, 1944, Serial No. 534,674

10 Claims. (Cl. 254—187)

1

This invention has relation to a material handling apparatus useful for many purposes, but designed to be more especially useful as a winch for employment on cargo transporting air planes.

An object of the invention is to provide a material handling apparatus constituted as a winch intended to be installed in a cargo transporting air plane for use to the purpose of loading cargo upon and removing cargo from the cargo transporting air plane.

A further object is to provide a material handling apparatus, or cargo winch, which will be of relatively light weight and will occupy relatively small space, as upon or in an air plane, but will, at the same time, be equipped to handle articles or freight having comparatively great weight, as, for instance, articles or freight of types which can be transported by air planes.

A further object is to provide a material handling apparatus especially designed for use to the purpose of loading and unloading air planes which will at all times be fit for operation, regardless of weather and temperature conditions and variations to which the material handling apparatus may be subjected.

And a further object is to provide a material handling apparatus which will incorporate features and characteristics of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification.

With respect to the drawings and the numerals of reference thereon, a base for the material handling apparatus is denoted at 25. As will be more clear from Figs. 1 to 4 and 9 to 16, the base 25 consists of a body 26 and supports 27 for said base integral with said body. The supports 27 include supports through the instrumentality of which the base can be rested upon and secured to a horizontal surface and supports through the instrumentality of which said base can be rested against and secured to a vertical surface, as upon a transport airplane. Spaced apart bearings provided by the body 26 of the base of the material handling apparatus are represented at 28 and 29, respectively, and a curvilinear web 30 of said body 26 extends between said bearings 28 and 29 at the rear of the base 25. A substantially cylindrical extension portion of the body 26, at the outer side of and in surrounding relation to the bearing 29, is constituted as a gear housing 31 of the material handling apparatus. A cover 32 for the gear housing 31 is fitted up against and secured to the outer end of said gear housing 31, as at 33. The cover 32 integrally includes a bearing 34, arranged centrally of said cover 32, alined with the bearings 28 and 29. The bearing 29 is disposed at the inner side of the gear housing 31, and the bearing 34 is disposed at the outer side of said gear housing 31. A substantially cylindrical extension portion 35 of said body 26, at the outer side of and in surrounding relation to the bearing 28, integrally supports a flange member 36 disposed transversely of the base 25. A second gear housing 37 of the material handling apparatus is disposed outwardly of the bearing 28. Said second gear housing 37 is constituted as a cylindrical member having an integral outwardly extending flange 38 fitted up against and secured to the flange member 36, as at 39. The second gear housing 37 integrally includes a bearing 40, arranged centrally of said second gear housing 37, alined with the bearings 28, 29 and 34. The cylindrical extension portion 35 serves as a cover plate for the inner end of the second gear housing 37. A cover 41 for said second gear housing 37 is fitted up against and secured to the outer end of the second gear housing, as at 42.

Figures 1, 2:
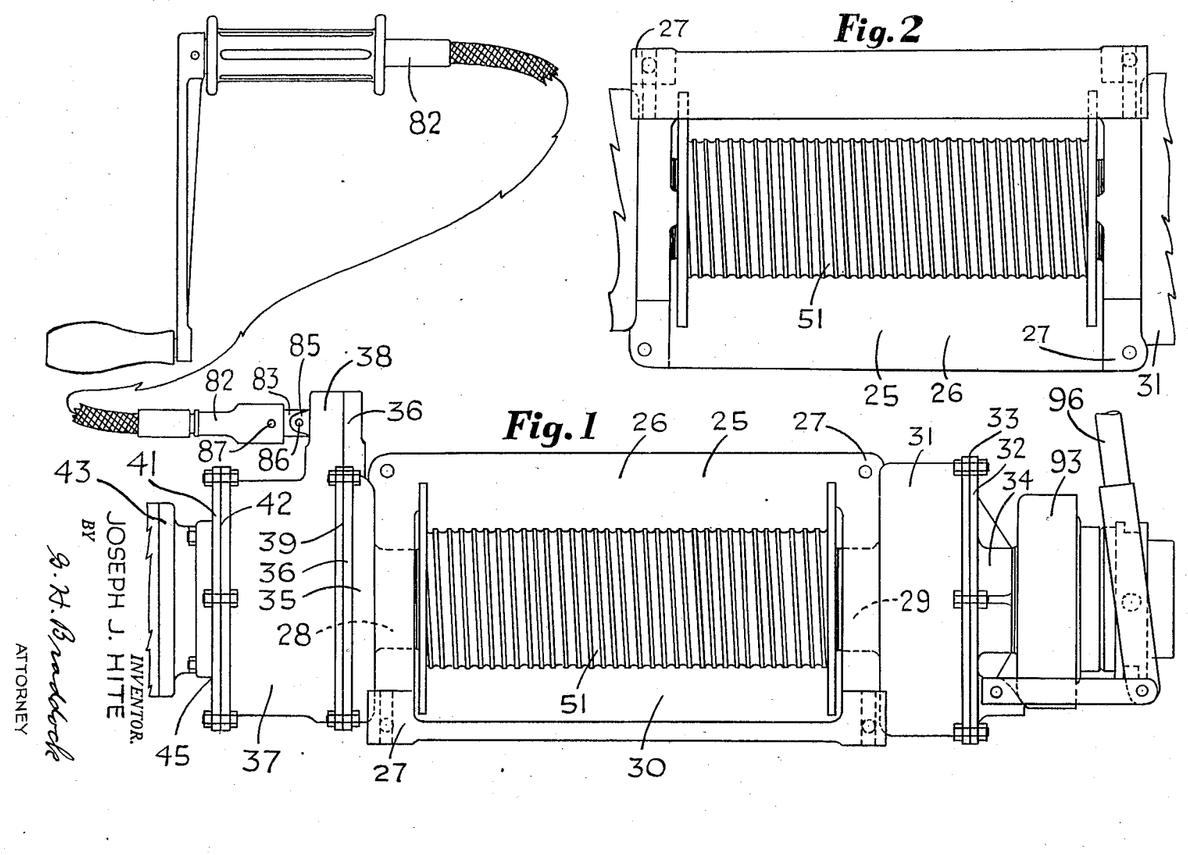
Fig. 1 is a front elevational view, partially broken away, of a material handling apparatus made according to the invention.
Fig. 2 is a fragmentary top plan view of the material handling apparatus of Fig. 1.
Figures 3, 4, 5, 6:
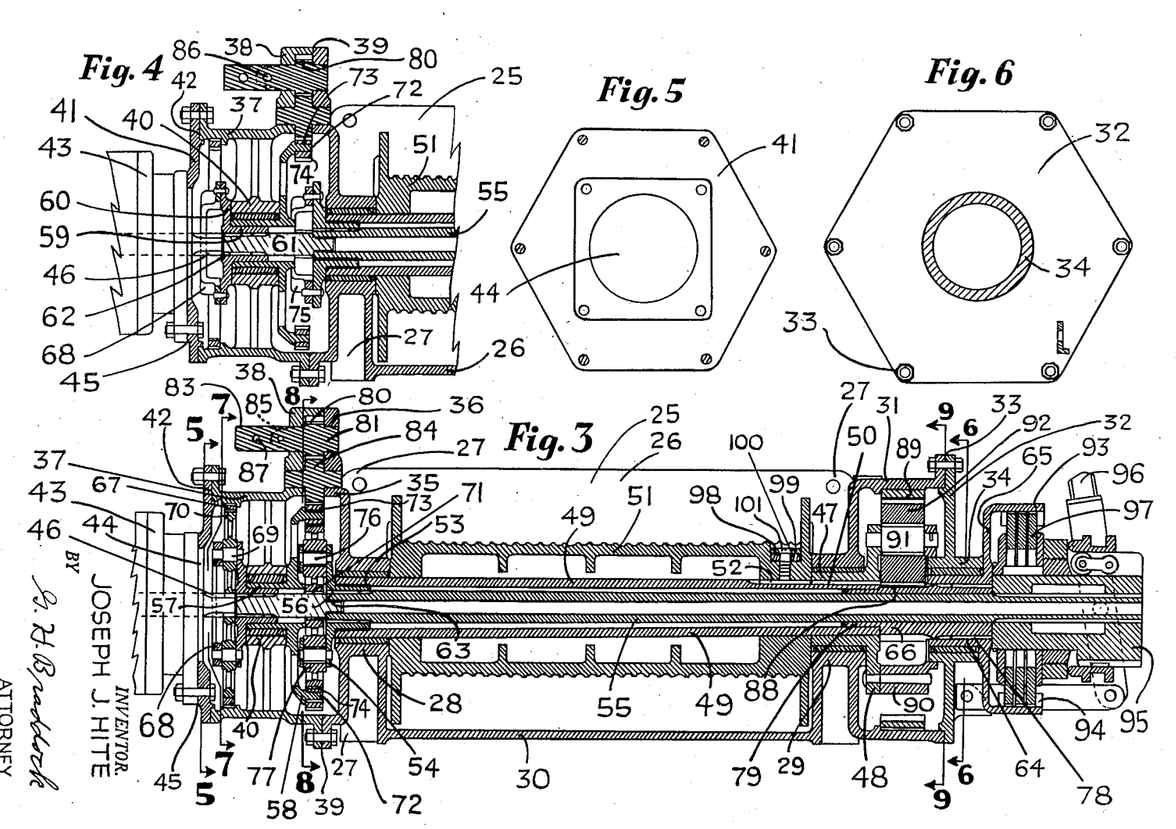
Fig. 3 is a longitudinal sectional view, partially broken away, of the material handling apparatus.
Fig. 4 is a fragmentary longitudinal sectional view agreeing generally with the disclosure of Fig. 3 but showing parts in different positions.
Fig. 5 is a transverse sectional view, taken as on line 5—5 in Fig. 3, detailing a cover for one of the gear housings of the material handling apparatus.
Fig. 6 is a transverse sectional view, taken as on line 6—6 in Fig. 3, detailing a cover for another of the gear housings of said material handling apparatus.
Figures 7, 8, 9, 17, 18, 19:
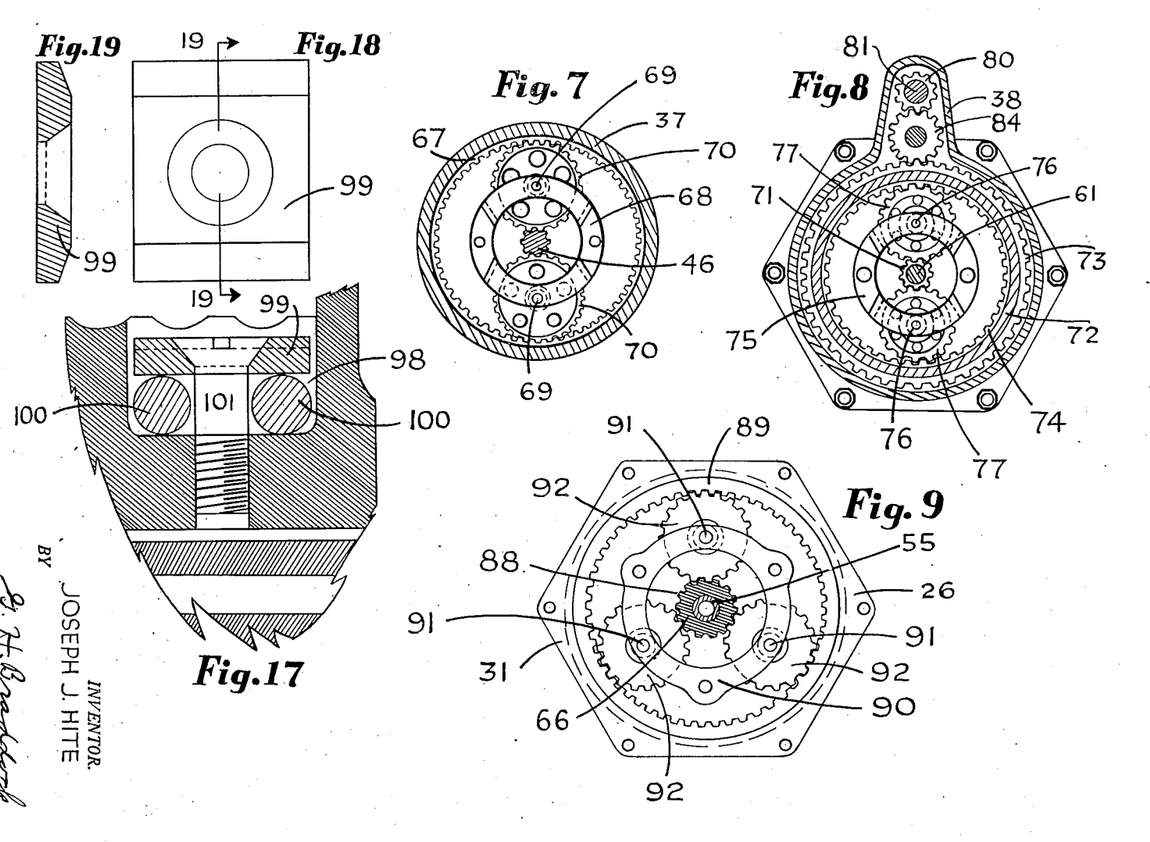
Fig. 7 is a transverse sectional view, taken as on line 7—7 in Fig. 3.
Fig. 8 is a transverse sectional view, taken as on line 8—8 in Fig. 3.
Fig. 9 is a transverse sectional view, taken as on line 9—9 in Fig. 3.
Fig. 17 is an enlarged fragmentary sectional view, agreeing generally with the disclosure of Fig. 3, detailing features of the rope clamp upon the drum of the material handling apparatus.
Fig. 18 is an enlarged plan view of the rope clamp bar.
Fig. 19 is a sectional view of the rope clamp bar, taken on line 19—19 in Fig. 18.
Figure 10:
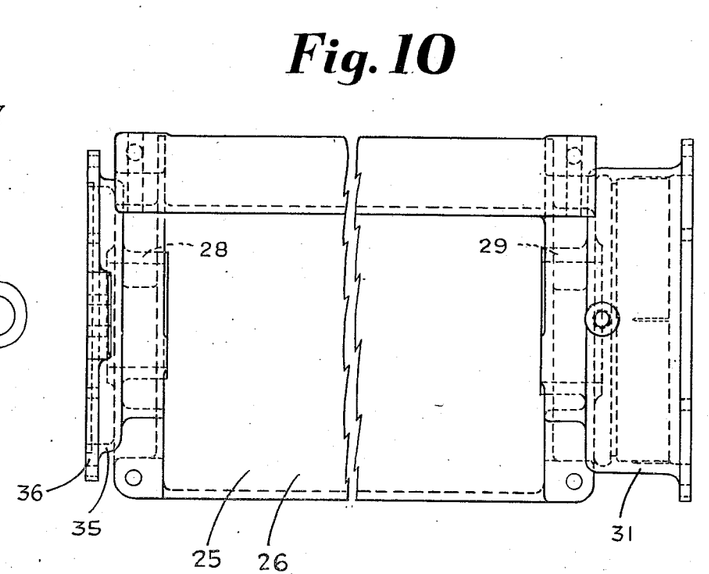
Fig. 10 is an enlarged plan view of the base of the material handling apparatus.
Figure 11:
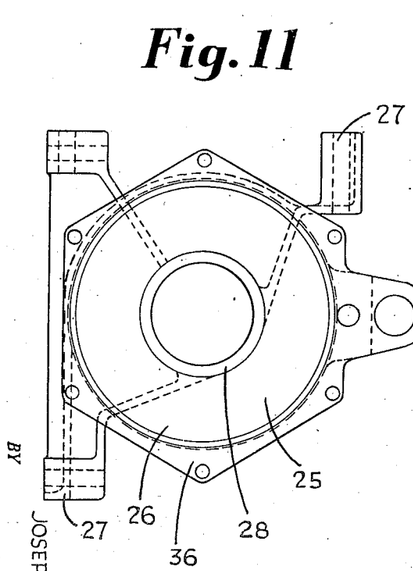
Fig. 11 is an end elevational view of the base of the material handling apparatus as said base would appear from the left in Fig. 10.
Figure 12:
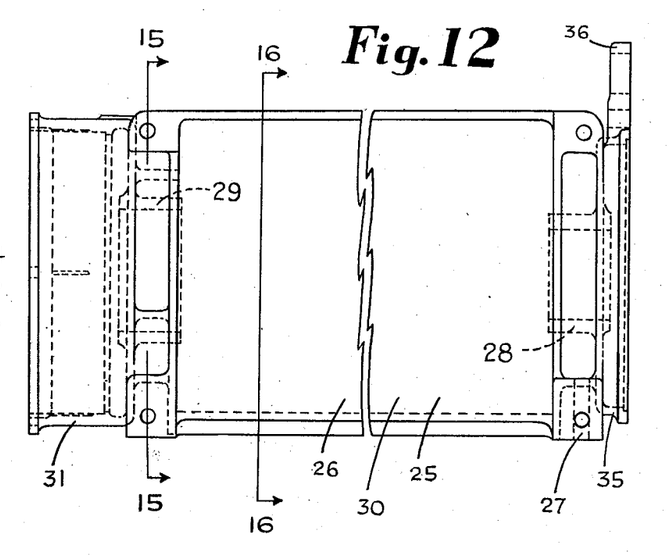
Fig. 12 is an enlarged rear elevational view of the base of the material handling apparatus.
Figure 13:
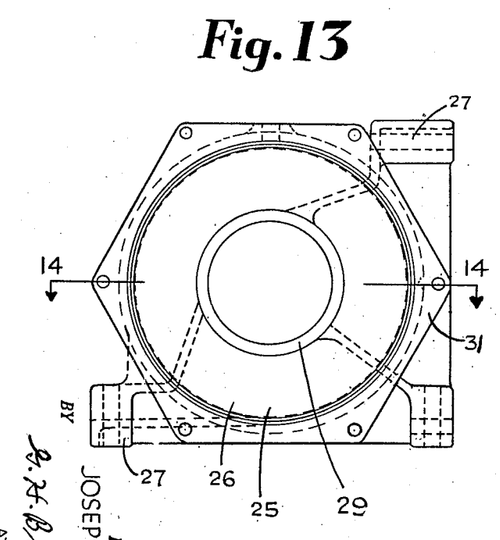
Fig. 13 is an end elevational view of the base of the material handling apparatus as said base would appear from the left in Fig. 12.
Figure 14:
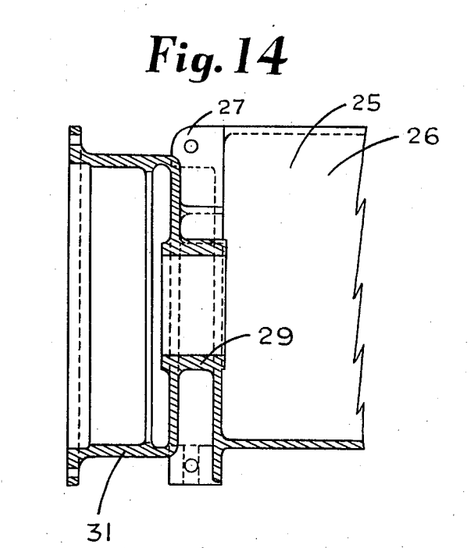
Fig. 14 is a fragmentary horizontal transverse sectional view of the base of the material handling apparatus, taken on line 14—14 in Fig. 13.
Figures 15, 16:
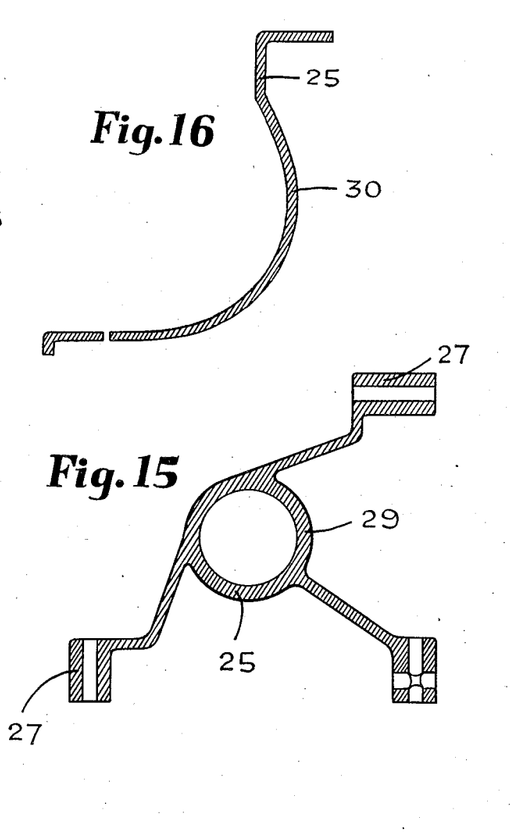
Fig. 15 is a vertical transverse sectional view of the base of the material handling apparatus, taken on line 15—15 in Fig. 12.
Fig. 16 is a vertical transverse sectional view of the base of the material handling apparatus, taken on line 16—16 in Fig. 12.
Figure 20:
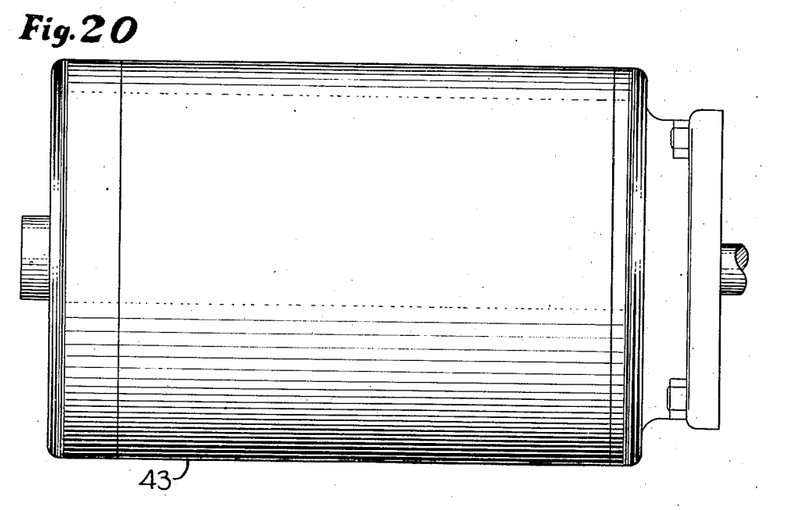
Fig. 20 is an enlarged elevational view of an electric motor of the material handling apparatus.
Figure 21:
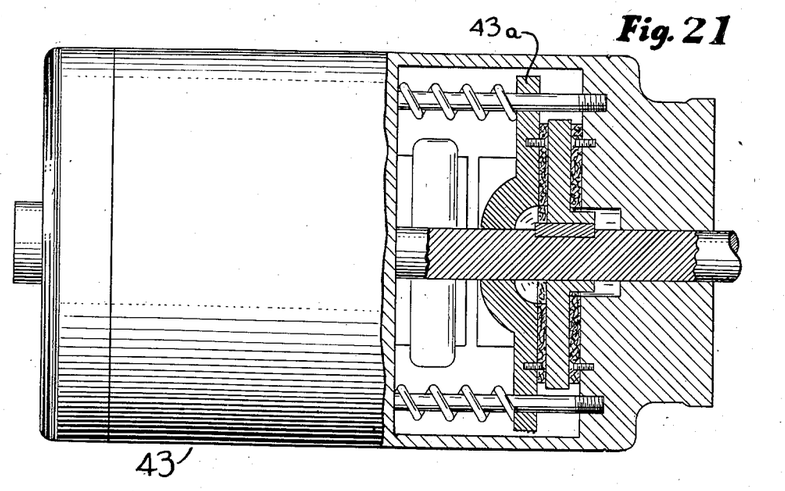
Fig. 21 is a view of said electric motor and its brake, partially in elevation and partially in section.

A high speed electric motor of the material handling apparatus is designated at 43. Said electric motor 43 is of the type equipped with automatic, magnetic brake 43a. The cover 41 of the material handling apparatus includes a centrally arranged opening 44 alined with the bearings 40, 28, 29 and 34, and the electric motor 43 is secured up against the cover 41, as at 45, so that its driven shaft lies in said opening 44. Said driven shaft of the electric motor 43 includes a small gear 46 which is situated within the second gear housing 37 adjacent the outer end of said second gear housing.

The bearing 29 rotatably supports the hub 47 of a planet spider 48 situated within the gear housing 31 adjacent the inner end of said gear housing 31, and a drum shaft 49 has one of its end portions situated in and splined to said hub 47, as at 50, and its other end portion rotatably mounted in the bearing 28. A drum 51 of the material handling apparatus is situated upon the drum shaft 49 and is disposed between the bearings 28 and 29. More explicitly, the drum 51 extends substantially the distance between said bearings 28 and 29, and is splined to the drum shaft 49, as at 52.

The drum shaft 49 is hollow, and the end portion of said drum shaft which is rotatably mounted in the bearing 28 provides a bearing arranged interiorly of the hollow drum shaft which rotatably supports the hub 53 of a planet spider 54 situated within the second gear housing 37 adjacent the inner end of said second gear housing 37, and a hollow clutch shaft 55 has one of its end portions situated in and splined to said hub 53, as at 56.

The bearing 40, provided by the second gear housing 37, rotatably supports the hub 57 of a spider 58 situated within the second gear housing 37 outwardly of the planet spider 54. Said hub 57 of said spider 58 in turn rotatably supports the hub 59 of a planet spider 60 situated within said second gear housing 37 adjacent the outer end of said second gear housing 37, and a stub shaft 61 has one of its end portions situated in and splined to said hub 59, as at 62, and its other end portion rotatably mounted, as at 63, in a bearing provided by and arranged interiorly of the hollow clutch shaft 55. The spider 58 is situated between and in spaced relation to the planet spiders 54 and 60.

The bearing 34, provided by the cover 32 for the gear housing 31, rotatably supports the hub 64 of a clutch spider 65 situated outwardly of said bearing 34, and a stub shaft 66, rotatably mounted upon an intermediate portion of the hollow clutch shaft 55 spaced from the end portion of said hollow clutch shaft situated in and splined to the hub 53 of the planet spider 54, has one of its end portions situated in and splined to said hub 64, as at 78, and its other end portion rotatably mounted, as at 79, in a bearing provided by and arranged interiorly of the hollow drum shaft 49. The end portion of the hollow clutch shaft 55 which is opposite the end portion of said hollow clutch shaft splined to the hub 53 of said planet spider 54 terminates at a location somewhat outwardly of the clutch spider 65, and said clutch spider is in spaced, surrounding relation to the hollow clutch shaft.

An internal gear 67, in spaced, surrounding relation to the small gear 46 upon the driven shaft of the electric motor 43, is suitably and conveniently fixed in the outer end of the second gear housing 37, and the planet spider 60, in cooperation with a spider ring 68 and pivot pins 69, 69 in said planet spider 60 and said spider ring 68, rotatably supports spaced apart, oppositely disposed spur gears 70, 70 each of which is in mesh at its exterior with teeth of the internal gear 67 and at its interior with teeth of the small gear 46. That is to say, the spur gears 70, 70 are at diametrically opposite sides of the driven shaft of the electric motor 43, and each spur gear 70 is between and in mesh with said small gear 46 and said internal gear 67.

The stub shaft 61 fixedly carries a small gear 71 which is situated at the end of said stub shaft 61 adjacent the hollow clutch shaft 55, and the spider 58, integral with the hub 57 rotatably mounted in the bearing 40 provided by the second gear housing 37, integrally supports an annular member 72 in spaced, surrounding relation to said small gear 71. An external gear 73 is suitably and conveniently fixed upon and about the outer surface of said annular member 72, and an internal gear 74 is suitably and conveniently fixed upon and about the inner surface of the annular member 72. The planet spider 54, in cooperation with a spider ring 75 and pivot pins 76, 76 in said planet spider 54 and said spider ring 75, rotatably supports spaced apart, oppositely disposed spur gears 77, 77 each of which is in mesh at its exterior with teeth of the internal gear 74 and at its interior with teeth of the small gear 71. Stated otherwise, the spur gears 77, 77 are at diametrically opposite sides of the stub shaft 61, and each spur gear 77 is between and in mesh with said small gear 71 and said internal gear 74.

A manually actuable small gear 80 is adapted to be employed for the purpose of rotating the external gear 73, thus to rotate the spider 58 fixedly supporting said external gear 73, when this is intentional. More explicitly, the small gear 80 is situated between the flange member 36 and the flange 38 and fixedly supported upon a stub shaft 81 rotatably mounted in said flange member and flange. A hand crank assembly, denoted generally at 82, is adapted to be applied to an extension portion 83 of said stub shaft 81 when said small gear 80 is to be manually rotated. An idler pinion 84, rotatably supported between and by the flange member 36 and the flange 38, meshes with both the external gear 73 and the small gear 80. The annular member 72, having the external gear 73 and the internal gear 74, is adapted or intended to be held stationary when the electric motor is operative to actuate the material handling apparatus. To this end, the flange 38 is provided with spaced apart, perforated ears 85, 85 adapted to receive a locking pin (not shown) also adapted to be passed through an opening 86 in the stub shaft 81 alined with the perforations in said ears 85. The locking pin is in practice removed from the opening 86 and employed in an opening 87 in said stub shaft 81 to secure the hand crank assembly 82 in operative position when the material handling apparatus is to be manually actuated.

The stub shaft 66 fixedly carries a small gear 88 which is situated between the bearing 34 and the planet spider 48, and an internal gear 89, in spaced, surrounding relation to the small gear 88, is suitably and conveniently fixed in the gear housing 31. Said planet spider 48, in coöperation with a spider ring 90 and pivot pins 91, 91, 91 in said planet spider 48 and said spider ring 90, rotatably supports spur gears 92, 92, 92, spaced at 120 degrees apart, each of which is in mesh at its exterior with teeth of the internal gear 89 and at its interior with teeth of the small gear 88. That is to say, the spur gears 92, 92, 92 are spaced at 120 degrees apart about the small gear 88, and each spur gear 92 is between and in mesh with said small gear 88 and said internal gear 89.

The clutch spider 65, splined to the stub shaft 66, is constituted as a part of a mechanism for connecting the hollow clutch shaft 55 with and releasing said hollow clutch shaft from the stub shaft 66. The details of construction of the clutch mechanism as such form no essential part of the present invention. The clutch spider 65 integrally supports a hollow substantially cylindrical member 93 splined, as at 94, at its inner surface, and the clutch mechanism includes a hub 95 rotatable with and slidable longitudinally along the hollow clutch shaft 55. The hub 95 is adapted to be moved longitudinally of said hollow clutch shaft 55, thus to cause clutch elements 97 rigid with said hub 95 to be engaged with and disengaged from the splined inner surface of the hollow cylindrical member 93 upon the clutch spider 65, by operation of an actuating handle 96 for the clutch. When the clutch elements 94 and 97 are engaged, said clutch spider 65 will be rotated in response to rotation of the hollow clutch shaft 55, and when said clutch elements 94 and 97 are disengaged, the clutch spider 65 will not be rotated in response to rotation of said hollow clutch shaft 55.

A rope clamp upon the drum 51 of the material handling apparatus is disclosed in Figs. 3, 17, 18 and 19. As there shown, said drum 51 is cut away to provide a concavity 98 in the outer surface of the drum. A rope clamp bar 99 is held down in said concavity, against rope or cable 100 for the drum, through the instrumentality of a fastening screw 101 which passes centrally through the rope clamp bar 99, is situated between lengths of said rope or cable 100 and is threaded into said drum.

The manner in which the material handling apparatus operates, or is operated, will now be described. The manually actuable gear 80 is held stationary; thus to retain the external gear 73, the annular member 72 and the internal gear 84 in stationary position, by a locking pin in the perforated ears 85, 85 and in the opening 86 through the stub shaft 81, when it is intended that the drum 51 be driven by the electric motor 43. Assuming the clutch elements 94 and 97 of the clutch mechanism to be engaged, as in Fig. 3 of the drawings, rotation of the driven shaft of said electric motor 43 will cause said drum 51 to be rotated through the instrumentality of the small gear 46 upon said driven shaft, the internal gear 67, the spur gears 70, 70 between said small gear 46 and said internal gear 67, the planet spider 60 supporting said spur gears 70, 70, the stub shaft 61 splined to said planet spider 60, the small gear 71 upon said stub shaft 61, the internal gear 74, the spur gears 77, 77 between said small gear 71 and said internal gear 74, the planet spider 54 supporting said spur gears 77, 77, the hollow clutch shaft 55 splined to said planet spider 54, the clutch mechanism, the clutch spider 65, the stub shaft 66 splined to said clutch spider 65, the small gear 88 upon said stub shaft 66, the internal gear 89, the spur gears 92, 92, 92 between said small gear 88 and said internal gear 89, the planet spider 48 supporting said spur gears 92, 92, 92, and the drum shaft 49 splined to said planet spider 48 and to the drum 51.

The small gear 46 upon the electric motor shaft, the internal gear 67, the spur gears 70, 70 and the planet spider 60 constitute a first speed reduction gearing arrangement of the material handling apparatus. The stationary internal gear 67 and the small gear 46 when driven cause the spur gears 70, 70 to be moved circumferentially about said internal gear 67 and said small gear 46, and the planet spider 60 to be rotated in the hub 57 of the spider 58. The small gear 71 upon the stub shaft 61, the internal gear 74, the spur gears 77, 77 and the planet spider 54 constitute a second speed reduction gearing arrangement of the material handling apparatus. The internal gear 74, held stationary by the locked small gear 80, and the small gear 71 when driven cause the spur gears 77, 77 to be moved circumferentially about said internal gear 74 and said small gear 71, and the planet spider 54 to be rotated in its bearing in the adjacent end portion of the drum shaft 49. The small gear 88 upon the stub shaft 66, the internal gear 89, the spur gears 92, 92, 92 and the planet spider 48 constitute a third speed reduction gearing arrangement of the material handling apparatus. The stationary internal gear 89 and the small gear 88 when driven cause the spur gears 92, 92, 92 to be moved circumferentially about said internal gear 89 and said small gear 88, and the planet spider 48 to be rotated in the bearing 29. As will be apparent, the clutch mechanism is situated between the second and the third speed reduction gearing arrangements.

The manually actuable small gear 80 is rotated through the instrumentality of the hand crank assembly 82 when the drum 51 is to be manually driven. The electric motor 43 and its automatic, magnetic brake 43a are adapted to retain the driven shaft of said electric motor, and hence the small gear 46, the spur gears 70, 70, the spider 60 and the stub shaft 61, stationary during manual actuation of said drum 51. Assuming the clutch elements 94 and 97 of the clutch mechanism to be engaged, as in Fig. 3, rotation of the internal gear 74, in response to rotation of the small gear 80, will cause the drum 51 to be rotated through the instrumentality of the now stationary small gear 71 upon said stub shaft 61, the spur gears 77, 77 between said stationary small gear 71 and said internal gear 74, the planet spider 54 supporting said spur gears 77, 77, the hollow clutch shaft 55 splined to said planet spider 54, the clutch mechanism, the clutch spider 65, the stub shaft 66 splined to said clutch spider 65, the small gear 88 upon said stub shaft 66, the internal gear 89, the spur gears 92, 92, 92 between said small gear 88 and said internal gear 89, the planet spider 48 supporting said spur gears 92, 92, 92, and the drum shaft 49 splined to said planet spider 48 and to said drum 51. The stationary small gear 71 and the internal gear 74 when driven cause the spur gears 77, 77 to be moved circumferentially about said stationary small gear 71 and said internal gear 74, and the planet spider 54 to be rotated.

Attention is called to the fact that when the material handling apparatus is being actuated by the electric motor 43, the internal gear 74 is stationary and the small gear 71 is driven, and when said apparatus is being actuated manually, said small gear 71 is stationary and said internal gear 74 is driven. Evidently, when the small gear 71 is rotated while the internal gear 74 is stationary, as well as when said internal gear 74 is rotated while said small gear 71 is stationary, the spur gears 77, 77, and the planet spider 54 will be caused to move about the axis of said planet spider 54.

For manual actuation of the drum 51, the small gear 89, the idler pinion 84 and the external gear 73 fixed upon the annular member 72 integral with the spider 58 constitute a first speed reduction gearing arrangement of the material handling apparatus. That is to say, whether the drum 51 is driven by the electric motor 43 or manually driven by employment of the hand crank assembly 82, the material handling apparatus includes three separate speed reduction gearing arrangements. In the instance of both power and manual operation of said apparatus, the clutch mechanism is interposed between the second and the third speed reduction gearing arrangements.

A material handling apparatus, or cargo winch, made according to the invention can be of relatively light weight, occupy but relatively small space, and yet be equipped to handle comparatively heavy articles or freight. The material handling apparatus or cargo winch herein presented was designed for use primarily as equipment to be installed in cargo transporting airplanes. Lightness of weight and smallness of size of an apparatus or winch to be installed in an airplane are, of course, factors of controlling importance. The material handling apparatus of the present application has been devised to be as light as possible, occupy but a minimum of space, and yet equipped to handle heavy loads. The construction and arrangement, including the hollow drum shaft 49, the hollow clutch shaft 55, the three speed reductions, etc., lends itself toward both lightness of weight and occupation of considerably less space than is required for speed reduction gearings as ordinarily heretofore installed. A great many of the parts or elements of the apparatus can be, and are, made of lighter metals, such as magnesium or aluminum. That is to say, it is desirable that lighter metals be employed in the construction of the apparatus at all places where lighter metals can be satisfactorily and efficiently used. In instances where lighter metals would not work satisfactorily and efficiently, high grade steel is employed.

A material handling apparatus, or cargo winch, installed as permanent equipment in an airplane should, obviously, be constructed to be fit for operation at all times, regardless of weather and temperature conditions and variations to which the apparatus or winch may be subjected. The construction and arrangement of the present material handling apparatus lends itself admirably toward the likelihood that the apparatus will work instantly under adverse weather and temperature conditions. It might be mentioned that the parts or elements of the material handling apparatus will not become heated to any appreciable extent during operation of the apparatus. The relatively light structure will not cause or permit excessive heat to become stored in the apparatus.

The electric motor 43 employed will desirably be of high speed type. The higher the speed of said electric motor, the smaller its size can be. Since H. P. equals load by speed, the higher the speed of the electric motor, the greater the resultant H. P. applied for operation of the drum 51.

The drum shaft 49 and the drum 51 can be freely rotated as a unit so that the rope or cable 100 can be paid off quickly, as when said rope or cable is to be attached to a load to be handled, while the clutch mechanism of the material handling apparatus, or cargo winch, is positioned so that the clutch elements 94 and 97 are disengaged. Unloading, or letting a load down by gravity, can be accomplished with the clutch controlling the speed of lowering by using the clutch as a brake, which in turn reverts its braking power back to the motor brake, through the clutch shaft and the second and first speed reduction gearing arrangements.

What is claimed is:

1. Material handling apparatus comprising a drum, a rotatably mounted drum shaft fixedly supporting said drum, an electric motor for causing said drum shaft to be rotated, a device adapted to be manually actuated to cause said drum shaft to be rotated, an operative connection between said electric motor and said drum shaft constituted as a clutch shaft, a clutch mechanism and a plurality of speed reduction gearing arrangements including first and second speed reduction gearing arrangements between said electric motor and said clutch shaft and a third speed reduction gearing arrangement between said clutch mechanism and said drum shaft, an operative connection between said device adapted to be manually actuated and said drum shaft constituted as said clutch shaft, said clutch mechanism, said second speed reduction gearing arrangement, a fourth speed reduction gearing arrangement between said device adapted to be manually actuated and said second speed reduction gearing arrangement and said third speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

2. Material handling apparatus comprising a drum, a rotatably mounted drum shaft fixedly supporting said drum, an electric motor for causing said drum shaft to be rotated, a device adapted to be manually actuated to cause said drum shaft to be rotated, an operative connection between said electric motor and said drum shaft constituted as a first speed reduction gearing arrangement, a second speed reduction gearing arrangement, a clutch shaft, a clutch mechanism and a third speed reduction gearing arrangement, an operative connection between said device adapted to be manually actuated and said drum shaft constituted as a fourth speed reduction gearing arrangement, said second speed reduction gearing arrangement, said clutch shaft, said clutch mechanism and said third speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

3. Material handling apparatus comprising a drum, a rotatably mounted drum shaft fixedly supporting said drum, an electric motor for causing said drum shaft to be rotated, a device adapted to be manually actuated to cause said drum shaft to be rotated, an operative connection between said electric motor and said drum shaft constituted as a first speed reduction gearing arrangement, a second speed reduction gearing arrangement, a clutch shaft, a clutch mechanism and a third speed reduction gearing arrangement, said first speed reduction gearing arrangement being interposed between said electric motor and the second speed reduction gearing arrangement, said second speed reduction gearing arrangement being interposed between the first speed reduction gearing arrangement and the clutch shaft, said clutch shaft being connected to the clutch mechanism, and said third reduction gearing arrangement being interposed between said clutch mechanism and said drum shaft, an operative connection between said device adapted to be manually actuated and said drum shaft constituted as a fourth speed reduction gearing arrangement, said second speed reduction gearing arrangement, said clutch shaft, said clutch mechanism and said third speed reduction gearing arrangement, said fourth speed reduction gearing arrangement being interposed between said device adapted to be manually actuated and said second speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

4. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a clutch shaft in said hollow drum shaft, a clutch mechanism and a plurality of speed reduction gearing arrangements including two speed reduction gearing arrangements between said electric motor and said clutch shaft and a third speed reduction gearing arrangement between said clutch mechanism and said hollow drum shaft, and an operative connection between said device adapted to be manually actuated and said hollow drum shaft constituted as said clutch shaft, said clutch mechanism, one of said two speed reduction gearing arrangements between said electric motor and said clutch shaft, a fourth speed reduction gearing arrangement between said device adapted to be manually actuated and said mentioned one of said two speed reduction gearing arrangements between the electric motor and the clutch shaft and said third reduction gearing arrangement between said clutch mechanism and said hollow drum shaft.

5. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a first speed reduction gearing arrangement, a second speed reduction gearing arrangement, a clutch shaft, a clutch mechanism and a third speed reduction gearing arrangement, and an operative connection between said device adapted to be manually actuated and said hollow drum shaft constituted as a fourth speed reduction gearing arrangement, said second speed reduction gearing arrangement, said clutch shaft, said clutch mechanism and said third speed reduction gearing arrangement.

6. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a first speed reduction gearing arrangement, a second speed reduction gearing arrangement, a clutch shaft in said hollow drum shaft, a clutch mechanism and a third speed reduction gearing arrangement, said first speed reduction gearing arrangement being interposed between said electric motor and the second speed reduction gearing arrangement, said second speed reduction gearing arrangement being interposed between the first speed reduction gearing arrangement and the clutch shaft, said clutch shaft being connected to the clutch mechanism, and said third speed reduction gearing arrangement being interposed between said clutch mechanism and said hollow drum shaft, and an operative connection between said device adapted to be manually actuated and said hollow drum shaft constituted as a fourth speed reduction gearing arrangement, said second speed reduction gearing arrangement, said clutch shaft, said clutch mechanism and said third speed reduction gearing arrangement, said fourth speed reduction gearing arrangement being interposed between said device adapted to be manually actuated and said second speed reduction gearing arrangement.

7. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a first speed reduction gearing arrangement, a second speed reduction gearing arrangement, a clutch shaft in said hollow drum shaft, a clutch mechanism and a third speed reduction gearing arrangement, an operative connection between said device adapted to be manually actuated and said drum shaft constituted as a fourth speed reduction gearing arrangement, said second speed reduction gearing arrangement, said clutch shaft, said clutch mechanism and said third speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

8. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a hollow clutch shaft in said hollow drum shaft, a clutch mechanism and a plurality of speed reduction gearing arrangements including first and second speed reduction gearing arrangements between said electric motor and said hollow clutch shaft and a third speed reduction gearing arrangement between said clutch mechanism and said hollow drum shaft, an operative connection between said device adapted to be manually actuated and said hollow drum shaft constituted as said hollow clutch shaft, said clutch mechanism, said second speed reduction gearing arrangement, a fourth speed reduction gearing arrangement between said device adapted to be manually actuated and said second speed reduction gearing arrangement and said third speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

9. Material handling apparatus comprising a drum, a rotatably mounted hollow drum shaft fixedly supporting said drum, an electric motor for causing said hollow drum shaft to be rotated, a device adapted to be manually actuated to cause said hollow drum shaft to be rotated, an operative connection between said electric motor and said hollow drum shaft constituted as a first planetary speed reduction gearing arrangement, a second planetary speed reduction gearing arrangement, a clutch shaft in said hollow drum shaft, a clutch mechanism and a third planetary speed reduction gearing arrangement, said first planetary speed reduction gearing arrangement being interposed between said electric motor and the second planetary speed reduction gearing arrangement, said second planetary speed reduction gearing arrangement being interposed between the first planetary speed reduction gearing arrangement and the clutch shaft, said clutch shaft being connected to the clutch mechanism, and said third planetary speed reduction gearing arrangement being interposed between said clutch mechanism and said hollow drum shaft, an operative connection between said device adapted to be manually actuated and said hollow drum shaft constituted as a speed reduction gearing arrangement, said second planetary speed reduction gearing arrangement, said clutch shaft, said clutch mechanism and said third planetary speed reduction gearing arrangement, said speed reduction gearing arrangement being interposed between said device adapted to be manually actuated and said second planetary speed reduction gearing arrangement, means for causing said speed reduction gearing arrangement to be stationary while said first planetary speed reduction gearing arrangement is operative, and means for causing said first planetary speed reduction gearing arrangement to be stationary while said speed reduction gearing arrangement is operative.

10. Material handling apparatus comprising a drum, a rotatably mounted drum shaft fixedly supporting said drum, an electric motor for causing said drum shaft to be rotated, a device adapted to be manually actuated to cause said drum shaft to be rotated, an operative connection between said electric motor and said drum shaft constituted as a first speed reduction gearing arrangement, a second speed reduction gearing arrangement, a clutch shaft, a clutch mechanism and a third speed reduction gearing arrangement, said first speed reduction gearing arrangement being interposed between said electric motor and the second speed reduction gearing arrangement, said second speed reduction gearing arrangement being interposed between the first speed reduction gearing arrangement and the clutch shaft, said clutch shaft being connected to the clutch mechanism, and said third speed reduction gearing arrangement being interposed between said clutch mechanism and said drum shaft, an operative connection between said device adapted to be manually actuated and said drum shaft constituted as a fourth speed reduction gearing arrangement, said second speed reduction gearing arrangement, said clutch shaft, said clutch mechanism and said third speed reduction gearing arrangement; said fourth speed reduction gearing arrangement being interposed between said device adapted to be manually actuated and said second speed reduction gearing arrangement, means for causing said fourth speed reduction gearing arrangement to be stationary while said first speed reduction gearing arrangement is operative, and means for causing said first speed reduction gearing arrangement to be stationary while said fourth speed reduction gearing arrangement is operative.

JOSEPH J. HITE.

REFERENCES CITED

The following references are of record in the file of this patent:

UNITED STATES PATENTS

| Number | Name | Date |
| --- | --- | --- |
| 475,834 | Webb | May 31, 1892 |
| 1,238,466 | Watson | Aug. 28, 1917 |
| 1,488,286 | Richter | Mar. 25, 1924 |
| 1,498,300 | Ryder | June 17, 1924 |
| 1,575,808 | Aaron | Mar. 9, 1926 |
| 1,578,965 | Eck | Mar. 30, 1926 |
| 1,752,962 | Atwell | Apr. 1, 1930 |

FOREIGN PATENTS

| Number | Country | Date |
| --- | --- | --- |
| 6,493 | Great Britain | 1908 |
| 179,720 | Great Britain | May 18, 1922 |